United States Patent
Lin et al.

(10) Patent No.: US 8,914,602 B2
(45) Date of Patent: Dec. 16, 2014

(54) DISPLAY CONTROLLER HAVING AN EMBEDDED NON-VOLATILE MEMORY DIVIDED INTO A PROGRAM CODE BLOCK AND A DATA BLOCK AND METHOD FOR UPDATING PARAMETERS OF THE SAME

(75) Inventors: Wen-Jui Lin, Shui Li Hsiang (TW); Hsien-Chun Chang, Chiehj Lung (TW); Yi-Shu Chang, Tainan (TW); Wen-Che Wu, Che Pei (TW)

(73) Assignee: Realtek Semiconductor Corp., Hsinchu (TW)

( * ) Notice: Subject to any disclaimer, the term of this patent is extended or adjusted under 35 U.S.C. 154(b) by 479 days.

(21) Appl. No.: 11/594,068

(22) Filed: Nov. 8, 2006

(65) Prior Publication Data
US 2007/0106835 A1 May 10, 2007

(30) Foreign Application Priority Data
Nov. 10, 2005 (TW) ................................ 94139353 A

(51) Int. Cl.
| | |
|---|---|
| G06F 12/00 | (2006.01) |
| G06F 9/445 | (2006.01) |
| G09G 3/20 | (2006.01) |
| G09G 5/36 | (2006.01) |

(52) U.S. Cl.
CPC ............... *G06F 8/65* (2013.01); *G09G 3/2096* (2013.01); *G09G 5/363* (2013.01); *G09G 2320/0606* (2013.01); *G09G 2320/08* (2013.01)
USPC ............... 711/170; 711/4; 711/103; 711/202; 711/206; 345/214; 345/98; 345/87; 345/27

(58) Field of Classification Search
CPC ............ G06F 12/0246; G06F 12/0802; G06F 2212/2022; G06F 3/0679; G06F 12/08; G06F 12/0868; G06F 13/1647
USPC ........ 345/98, 87, 214, 27; 711/103, 170, 202, 711/206, 4
See application file for complete search history.

(56) References Cited

U.S. PATENT DOCUMENTS

| | | | | |
|---|---|---|---|---|
| 6,000,006 | A * | 12/1999 | Bruce et al. .................... | 711/103 |
| 6,421,279 | B1 | 7/2002 | Tobita et al. | |
| 6,904,400 | B1 | 6/2005 | Peri et al. | |
| 2003/0221046 | A1* | 11/2003 | Lin et al. ........................ | 711/103 |

(Continued)

OTHER PUBLICATIONS

OMAP5910 Dual-Core Processor LCD Controller Reference Guide, Texas Instruments, Oct. 2003, pp. 1-58.*

(Continued)

*Primary Examiner* — Hong Kim
(74) *Attorney, Agent, or Firm* — McClure, Qualey & Rodack, LLP

(57) ABSTRACT

A controller and a method of updating parameters on the same. The controller includes an embedded non-volatile memory, a programming circuit, an embedded SRAM, a MCU (Micro Computer Unit), and a memory controller. The embedded non-volatile memory has a program code block for storing program codes to be executed by the MCU, and a data block for storing the parameters. The MCU writes the parameters into the data block of the flash memory through the memory controller, or reads data in the data block of the non-volatile memory through the memory controller. Because the controller does not need to employ an external EEPROM, the cost can be reduced and the speed for accessing the parameters can be increased.

4 Claims, 5 Drawing Sheets

(56) References Cited

U.S. PATENT DOCUMENTS

| | | | |
|---|---|---|---|
| 2005/0038961 A1* | 2/2005 | Chen | 711/118 |
| 2005/0166004 A1* | 7/2005 | Campanale et al. | 711/103 |
| 2006/0044295 A1* | 3/2006 | Yu et al. | 345/204 |
| 2006/0248267 A1* | 11/2006 | Xie | 711/103 |

OTHER PUBLICATIONS

RealTek, Flat Panel Display controller RTD2020, Nov. 12, 2002, pp. 1-11.*

* cited by examiner

U.S. Pat. No. 8,914,602 B2

DISPLAY CONTROLLER HAVING AN EMBEDDED NON-VOLATILE MEMORY DIVIDED INTO A PROGRAM CODE BLOCK AND A DATA BLOCK AND METHOD FOR UPDATING PARAMETERS OF THE SAME

This application claims the benefit of the filing date of Taiwan Application Ser. No. 094139353, filed on Nov. 10, 2005, the content of which is incorporated herein by reference.

BACKGROUND OF THE INVENTION

1. Field of the Invention

The invention relates to an electronic device, and more particularly to a controller for updating parameters in an electronic device.

2. Description of the Related Art

FIG. 1 shows a display controller for a typical LCD (Liquid Crystal Display). Referring to FIG. 1, the display controller 11 includes a flash memory (also referred to as FLASH) 112, a programming circuit 111, an embedded SRAM (Static Random Access Memory) 113, a MCU (Micro Computer Unit) 114, a memory controller 115, an external I/O controller 116 and a video processing unit 117. The current LCD uses an external accessible non-volatile memory 13, such as an electrically erasable programmable read only memory (EEPROM), for storing variable parameters. The program executed by the MCU 114 is written into the flash memory 112 through the programming circuit 111 using an external host 12. The programming circuit 111 accesses the flash memory 112 through a plurality of address/data signals A/D1 and a plurality of control signals CS1. In addition, the memory controller 115 also accesses the flash memory 112 and the embedded SRAM 113 through the address/data signals A/D1 and the control signals CS1.

When the LCD is working, the parameters may be modified by the user, and the modified parameters have to be held when the power is off. Thus, the MCU 114 of the display controller 11 utilizes the memory controller 115 and the external I/O controller 116 to write the parameters into the external non-volatile memory 13. As shown in FIG. 1, the user operates a human-machine interface to generate a user input signal. The MCU 114 processes the user input signal into parameters according to the program code, and the parameters are stored in the external non-volatile memory 13. Because the external non-volatile memory 13 is disposed outside the display controller 11, the system cost is increased.

In addition, U.S. Pat. No. 6,421,279, entitled "Flash memory control method and apparatus processing system therewith" and U.S. Pat. No. 6,904,400, entitled "Flash EEPROM memory emulator of non-flash EEPROM device and corresponding method" have disclosed methods of emulating the access to the EEPROM using the typical flash memory. FIG. 2 shows the architecture of emulating the EEPROM using the flash memory. Referring to FIG. 2, the memory architecture 21 includes a flash memory 212, a MCU 114, a memory controller 215, an address matching controller 218 and a buffer 219. In the prior art, additional circuits including the address matching controller 218 and the buffer 219 are used to emulate the access of EEPROM using the flash memory 212. The address matching controller 218 controls the used region of the flash memory 212.

SUMMARY OF THE INVENTION

It is therefore an object of the invention to provide a display controller for storing parameters in an embedded non-volatile memory so as to reduce the cost and increase the speed of reading the parameters.

Another object of the invention is to provide a control method for a display controller, wherein the method controls the access of parameters to the display controller, which stores the parameters in an embedded non-volatile memory.

The invention achieves the above-identified objects by providing a display controller including an embedded non-volatile memory, a programming circuit, an embedded SRAM, a MCU (Micro Computer Unit), a memory controller and a video processing unit. The embedded non-volatile memory has a program code block and a data block. The MCU writes parameters into the data block of the non-volatile memory through the memory controller, or reads the parameters in the data block of the non-volatile memory through the memory controller. Because the display controller of the LCD does not need to employ an erasable non-volatile memory (e.g., EEPROM) to store the parameters, the cost can be reduced, and the speed of accessing the parameters can be increased since the data does not have to be accessed by a slow external I/O controller.

BRIEF DESCRIPTION OF THE DRAWINGS

The subject matter regarded as the invention is particularly pointed out and distinctly claimed in the concluding portion of the specification. The invention, both as to device and method of operation, together with features and advantages thereof may best be understood by reference to the following detailed description with the accompanying drawings in which:

DETAILED DESCRIPTION OF THE INVENTION

The present invention relates to display controller and method for updating parameters. While the specifications describe several example embodiments of the invention considered best modes of practicing the invention, it should be understood that the invention can be implemented in many ways and is not limited to the particular examples described below or to the particular manner in which any features of such examples are implemented.

The flash memory (non-volatile memory) is rewritable. So, the display controller for storing parameters in an embedded non-volatile memory according to the invention utilizes the property and the advantage to define a portion of the embedded non-volatile memory as a parameter accessing region to replace the external accessible non-volatile memory (such as EEPROM) used in the prior art. Consequently, the display controller of this invention can store the parameters in the embedded non-volatile memory without using the EEPROM. So, the display controller for storing the parameters in the embedded non-volatile memory according to the invention has a low cost and a high speed of accessing data without using an external I/O controller.

Figure 1:
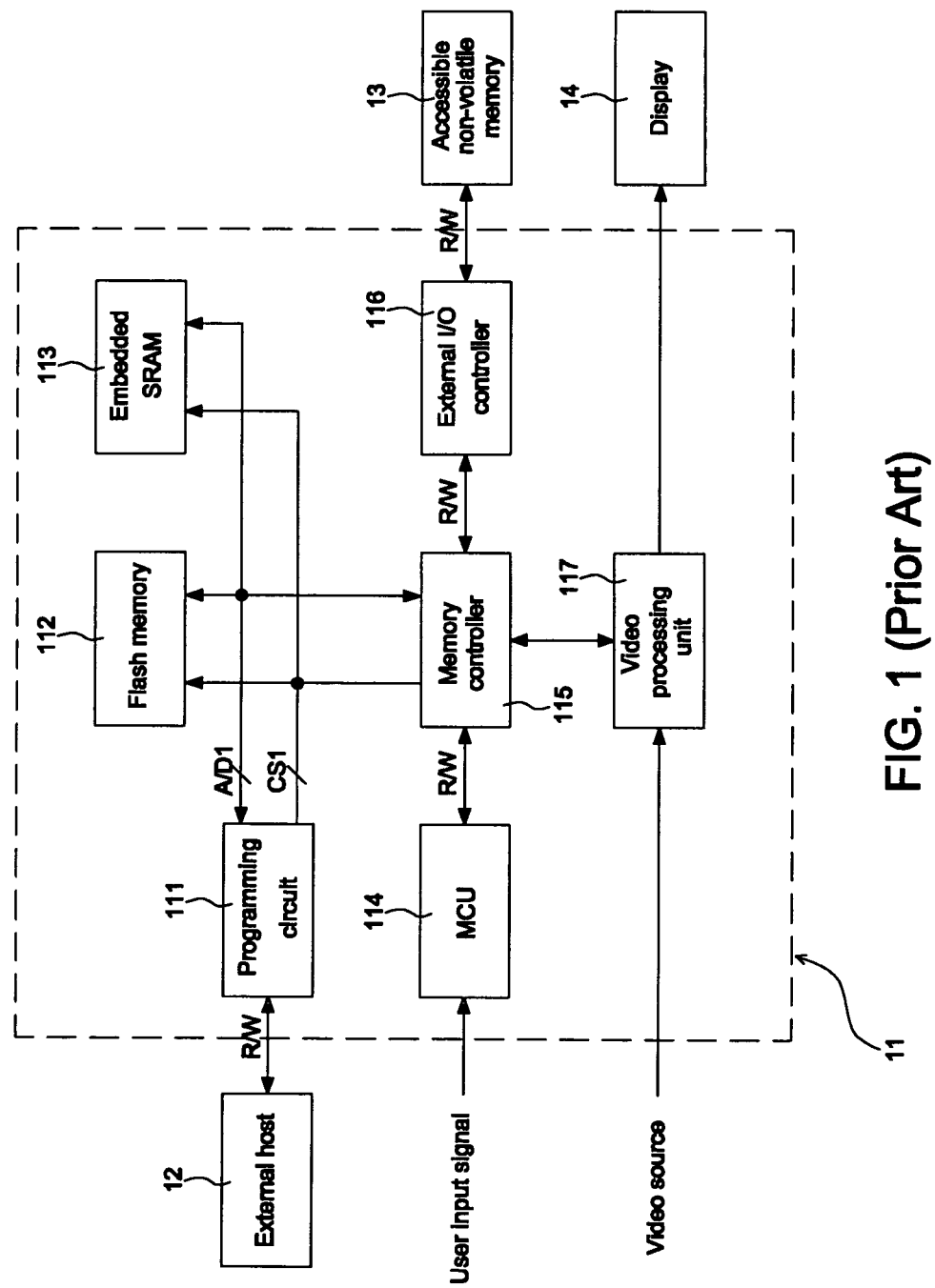
FIG. 1 shows a display controller for a typical LCD.
Figure 2:
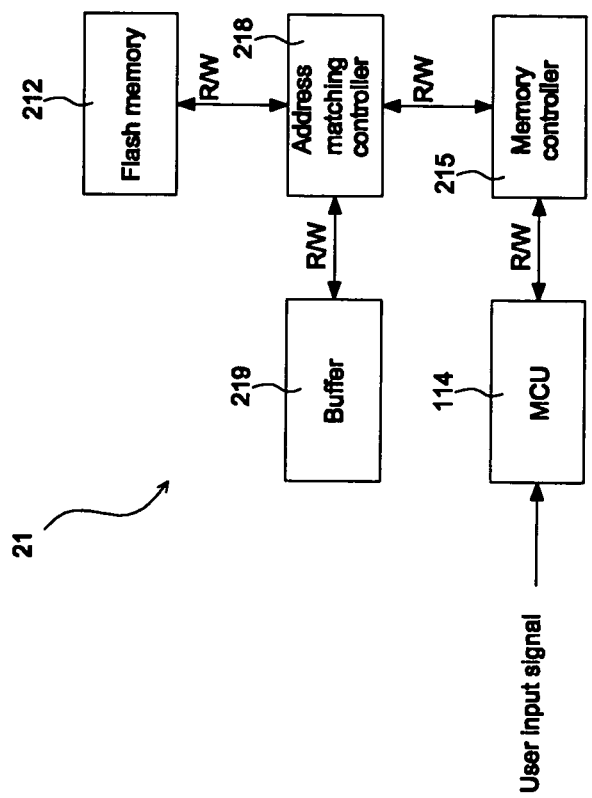
FIG. 2 shows the architecture of emulating the EEPROM using the flash memory.
Figure 3:
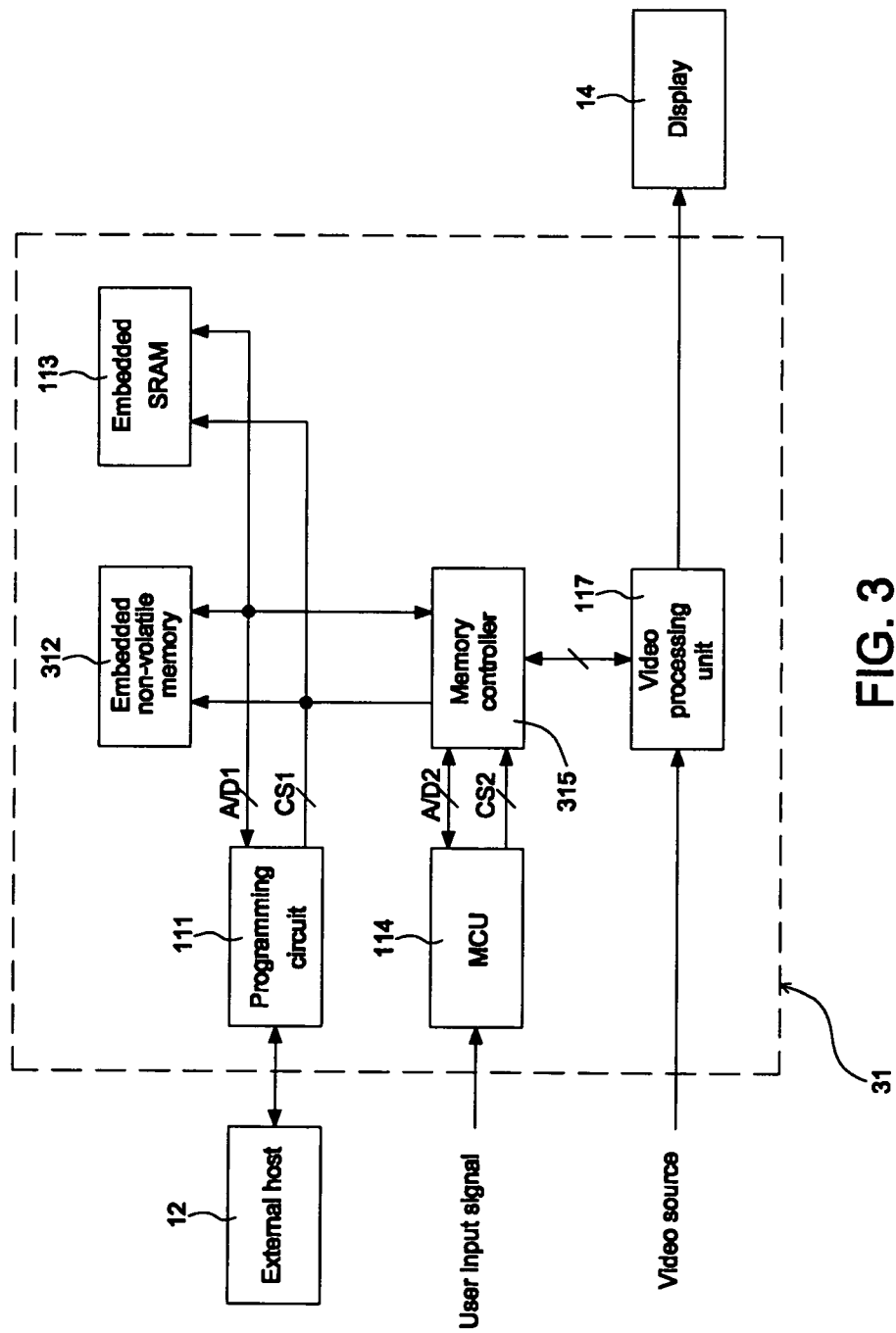
FIG. 3 shows the architecture of a LCD display controller according to a first embodiment of the invention.

FIG. 3 shows the architecture of a LCD display controller 31 according to a first embodiment of the invention. Referring to FIG. 3, the display controller 31 of the invention includes an embedded non-volatile memory (e.g., flash memory) 312, a programming circuit 111, an embedded SRAM 113, a MCU (Micro Computer Unit) 114, a memory controller 315 and a video processing unit 117. As shown in the drawing, the display controller of the invention does not need an EEPROM but utilizes a data block of the embedded non-volatile memory 312 to store parameters.

The embedded non-volatile memory 312 is divided into a program code block and the data block. The display controller 31 stores the parameters in the data block of the embedded non-volatile memory 312. In general, the program to be executed by the MCU 114 is stored in the program code block of the embedded non-volatile memory 312. In this embodiment, the program code stored in the program code block of the embedded non-volatile memory 312 only can be read by the MCU 114, and the memory controller 315 functions to prevent the MCU 114 from unintentionally writing data into the program code block. The parameters stored in the data block of the embedded non-volatile memory 312 are read or written by the MCU 114.

In the first embodiment, the programming circuit 111 writes the program code into the program code block of the embedded non-volatile memory 312 through a first address/data signal A/D1 and first control signals CS1. The MCU 114 transfers the data, the address and the control signals to the memory controller 315 through second address/data signals A/D2 and second control signals CS2 and the memory controller 315 accesses the data in the embedded non-volatile memory 312 through the first address/data signals A/D1 and the first control signals CS1 according to the second address/data signals A/D2 and the second control signals CS2.

TABLE 1

| Starting Address | Ending Address | MCU | Function |
|---|---|---|---|
| 0x00000 | 0x0FFFF | R | Program code block of non-volatile memory for storing program codes |
| 0x10000 | 0x17FFF | R/W | Data block of non-volatile memory for storing parameters |
| 0x18000 | 0x1FFFF | R/W | Embedded SRAM for storing variables |

Table 1 shows an embodiment of the configurations of the embedded non-volatile memory 312 and the embedded SRAM 113 according to the invention. The embodiment of the embedded non-volatile memory 312 has the memory capacity of 96K while the embedded SRAM 113 has the memory capacity of 32K. Of course, the memory capacity can be adjusted according to the system requirement. The program code block of the embedded non-volatile memory 312 has the allocated capacity of 64K and the data block of the embedded non-volatile memory 312 has the allocated capacity of 32K. The address range of the 64K program code block ranges from 0x00000 to 0x0FFFF, the address range of the 32K data block ranges from 0x10000 to 0x17FFF, and the address range of the 32K embedded SRAM 113 ranges from 0x18000 to 0x1FFFF. As can be understood from Table 1, the program code block only can be read by the MCU 114, while the data block and the embedded SRAM 113 may be read and written by the MCU 114. In this embodiment, the number of bits of the address signals of the MCU 114 is great enough, so the address range of the embedded SRAM 113 does not overlap with the address range of the embedded non-volatile memory 312. Consequently, the second control signals CS2 only needs a read control signal and a write control signal to access data into the memory unit specified by the address bus.

Figure 4:
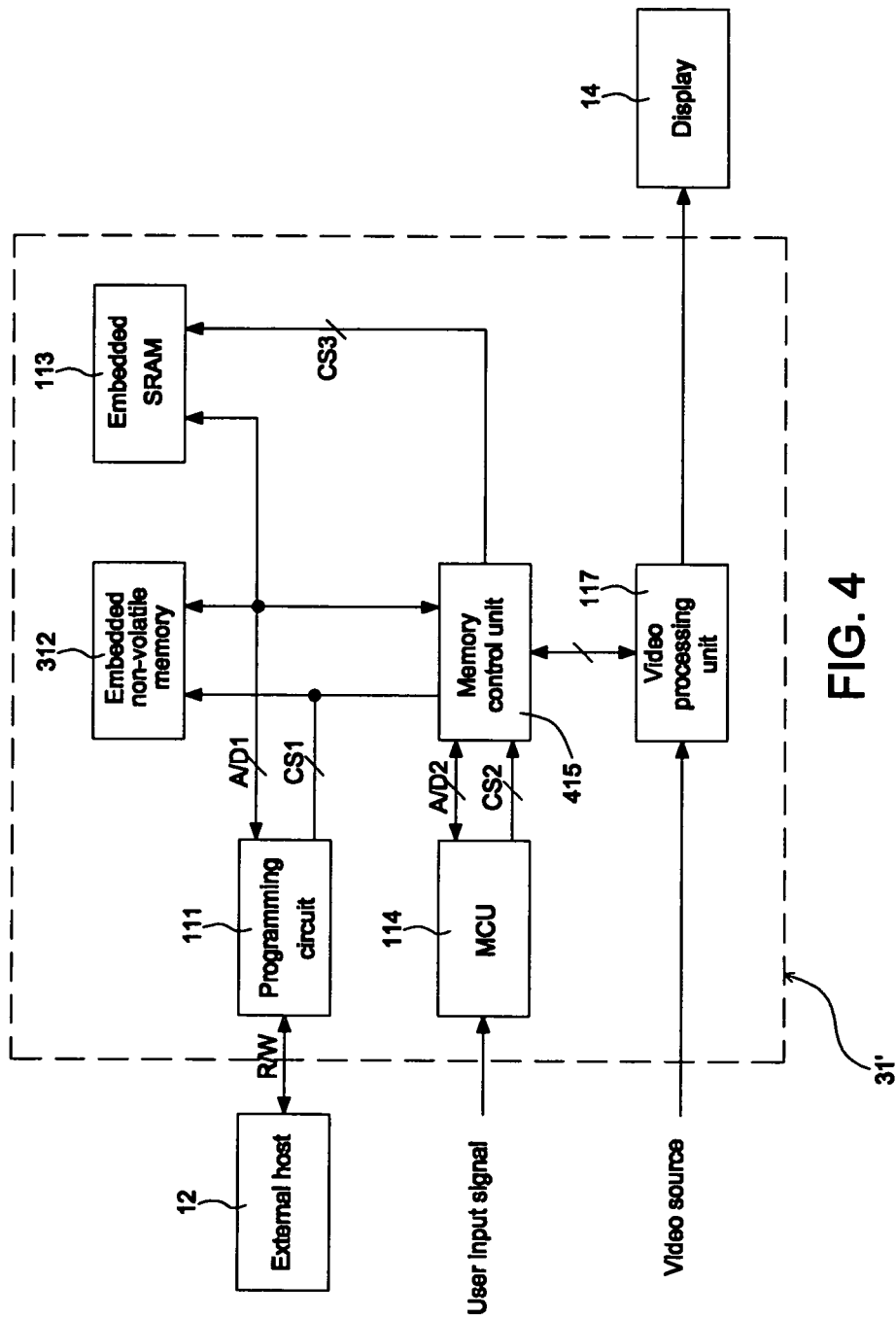
FIG. 4 shows the architecture of a LCD display controller according to a second embodiment of the invention.

FIG. 4 shows the architecture of a display controller 31 according to a second embodiment of the invention. In this embodiment, the address range of the embedded non-volatile memory 312 overlaps with the address range of the embedded SRAM 113. In one preferred embodiment, only the address range of the data block of the embedded non-volatile memory 312 overlaps with the address range of the embedded SRAM 113. For example, the address range of the embedded SRAM 113 also ranges from 0x10000 to 0x17FFFF. In the second embodiment, the second control signals CS2 requires two read control signals, which will not be enabled simultaneously, and two write control signals, which will not be enabled simultaneously. One of the read control signals represents to read the embedded non-volatile memory 312 and the other of the read control signals represents to read the SRAM 113. One of the write control signals represents to write the embedded non-volatile memory 312 and the other of the write control signals represents to write the SRAM 113. Consequently, the memory controller 315 can write the data to the correct device (embedded non-volatile memory 312 or SRAM 113) according to different control signals. Thus, a memory controller 415 outputs the control signals CS1 or CS3 to access the embedded non-volatile memory 312 or the embedded SRAM 113 according to the control signals CS2.

Figure 5:
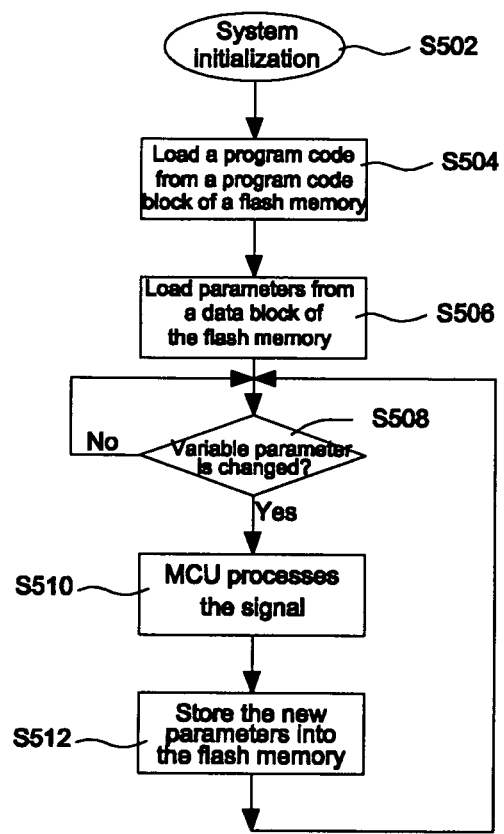
FIG. 5 is a flow chart showing the flash memory is used when the display system is working.

FIG. 5 is a flow chart showing the flash memory used when the display system is working. Because no EEPROM has to be employed, the display controller stores the parameters to the data block of the embedded non-volatile memory, and reads the parameters from the data block of the embedded non-volatile memory. The flow chart will be described in detail with reference to FIG. 5.

Step S502: System initialization.

Step S504: The MCU 114 loads the program codes from the program code block of the embedded non-volatile memory 312.

Step S506: The MCU 114 loads the parameters from the data block of the embedded non-volatile memory 312.

Step S508: Detect whether the parameters have been changed. The parameters are changed if a user modifies the predefined value, for example. If the parameters are not changed, step 508 is repeated. If the parameters are changed, the procedure jumps to the next step.

Step S510: The MCU 114 generates new parameters according to the user input signal.

Step S512: The MCU 114 stores the new parameters into the data block of the embedded non-volatile memory 312 via the second address/data signals A/D2 and the second control signals CS2, and the procedure jumps back to step S508. In an embodiment of this step, the second data signal comprises the new parameters.

In addition, when the flash memory serves as the embedded non-volatile memory 312, the number of writing times of the flash memory is limited. So, it is possible to increase the memory capacity of the flash memory in order to increase the number of writing times of the flash memory, and change the storage region when the number of writing times exceeds a threshold value. Because the MCU 114 can store the number of writing times of the flash memory in the flash memory, the MCU 114 stores an address translation table (ATT) in the embedded SRAM 113 according to the number of writing times when the system initiates. The address translation table records the address of the working region of the flash memory. So, when the MCU 114 wants to access the data of the flash memory, the MCU 114 reads the corresponding address of the address translation table from the embedded SRAM 113 and then outputs the corresponding address bus signal and control signal to access the flash memory through the memory controller 315. In one embodiment, the associated data of the address translation table is also stored in a specific block of the data block of the flash memory so that the MCU 114 can create a corresponding address translation table in the SRAM 113 when it is booted at the next time. Because the address of the flash memory for storing the parameters can be provided, the reading and writing of the parameters to the embedded non-volatile memory are performed by the memory controller 315. Because the circuit on the path is simple and it is unnecessary to perform the access through the low-speed external I/O controller, the access speed may be increased.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. An apparatus for updating at least one parameter, comprising:

an embedded non-volatile memory having a program code block being defined by a first address range for storing a program code and a data block being defined by a second address range for storing at least one parameter;

an embedded volatile memory for storing data;

a memory controller, which is directly coupled to the embedded non-volatile memory and the embedded volatile memory, for controlling reading/writing of the embedded non-volatile memory and the embedded volatile memory through a first interface signal; and a processor coupled to the memory controller through a second interface signal, which includes an address signal, a data signal and control signals, the processor executing the program code stored in the program code block, wherein the processor is configured to have read-only access to memory locations in the first address range of the non-volatile memory and read/write access to memory locations in the second address range of the non-volatile memory;

wherein a portion of the address range of the embedded non-volatile memory overlaps with a portion of the address range of the volatile memory;

wherein the coupling of the memory controller with the embedded non-volatile memory includes first control signals, the coupling of the processor with the memory controller includes second control signals, and the coupling of the memory controller with the volatile memory includes third control signals, and wherein the memory controller is configured to control the first and third control signals to ensure that they are not simultaneously enabled.

2. The apparatus of claim 1, wherein each of the control signals comprises a write control signal and a read control signal.

3. The apparatus of claim 1, wherein only the address range of a data block of the embedded non-volatile memory overlaps with the address range of the volatile memory.

4. The apparatus of claim 1, wherein the memory controller accesses one of the embedded non-volatile memory and the volatile memory by enabling one of the first controls signals and the third controls signals according to the second control signals.

* * * * *